(12) United States Patent
Park et al.

(10) Patent No.: US 11,016,995 B2
(45) Date of Patent: May 25, 2021

(54) K-MEANS CLUSTERING BASED DATA MINING SYSTEM AND METHOD USING THE SAME

(71) Applicants: SOGANG UNIVERSITY RESEARCH FOUNDATION, Seoul (KR); Seoul National University R&DB Foundation, Seoul (KR)

(72) Inventors: Seog Park, Seoul (KR); Kyuseok Shim, Hanam-si (KR); Hanjun Goo, Seoul (KR); Woohwan Jung, Seoul (KR); Seongwoong Oh, Seoul (KR); Suyong Kwon, Seoul (KR)

(73) Assignee: SEOUL NATIONAL UNIVERSITY R&B FOUNDATION, Seoul (KR)

( * ) Notice: Subject to any disclaimer, the term of this patent is extended or adjusted under 35 U.S.C. 154(b) by 135 days.

(21) Appl. No.: 16/406,167

(22) Filed: May 8, 2019

(65) Prior Publication Data

US 2019/0347278 A1 Nov. 14, 2019

(30) Foreign Application Priority Data

May 9, 2018 (KR) .......................... 10-2018-0053366

(51) Int. Cl.
*G06F 17/00* (2019.01)
*G06F 16/28* (2019.01)
*G06F 16/2458* (2019.01)

(52) U.S. Cl.
CPC ........ *G06F 16/285* (2019.01); *G06F 16/2465* (2019.01)

(58) Field of Classification Search
CPC .... G06F 16/285; G06F 16/2465; G06F 16/26; G06F 21/6245; G06F 21/71; G06F 2216/03
See application file for complete search history.

(56) References Cited

U.S. PATENT DOCUMENTS 6,115,708 A * 9/2000 Fayyad .................. G06F 16/35
6,311,181 B1 * 10/2001 Lee ...................... G06F 16/2462
(Continued)

FOREIGN PATENT DOCUMENTS

CN 102063486 5/2011
JP 2008-134750 6/2008
(Continued)

OTHER PUBLICATIONS

Hanjun Goo et al., "A Differentially Private K-Means Clustering using Quad-Tree" EIRIC in Jeju, Korea, Republic of, Jun. 18-20, 2017.

(Continued)

*Primary Examiner* — Greta L Robinson
(74) *Attorney, Agent, or Firm* — Lex IP Meister, PLLC

(57) ABSTRACT

A method of performing K-means clustering by a data mining system is provided. The method includes generating a plurality of initial buckets by dividing data including a plurality of points each being expressed in coordinate information, reflecting a count noise in a number of points included in each of the initial buckets and then generating a plurality of new buckets by dividing at least one initial bucket among the initial buckets based on a first threshold and a second threshold, generating a plurality of final buckets from the plurality of initial buckets or the plurality of new buckets, generating a histogram including section information for each of the final buckets and a number of points included in each of the final buckets in which the count noise is reflected, and performing K-means clustering on the histogram based on a number of clusters.

14 Claims, 8 Drawing Sheets

(56) References Cited

U.S. PATENT DOCUMENTS 7,590,642 B2 *   9/2009   Campos .............. G06K 9/6223
7,836,090 B2    11/2010   Perrizo et al.

FOREIGN PATENT DOCUMENTS

| KR | 10-2001-0031345 | 4/2001 |
| KR | 10-1700104 | 2/2017 |
| KR | 10-1770911 | 8/2017 |
| WO | 2016-150516 | 9/2016 |

OTHER PUBLICATIONS

Hanjun Goo et al., "Differentially Private k-Means Clustering based on Dynamic Space Partitioning using a Quad-Tree" Journal of KIISE, vol. 45, No. 3, pp. 288-293, 2018.

Hanjun Goo et al., "A Differential Privacy Preserving Algorithm for Histogram Publication", Journal of KIISE, pp. 278-280, 2016.

* cited by examiner

FIG. 4

| 1400 | | 105 | | 1101 | 870 |
|---|---|---|---|---|---|
| | | | | 1570 | 1750 |
| | | 207 | | 507 | |
| 1831 | 480 | 1700 | | 2103 | |
| 610 | 2300 | 570 | | 205 | 1608 | 1320 |
| 2510 | 1003 | | | 1306 | 2110 | |

FIG. 5

| | | 50.3 | | 1100.1 | 827.2 |
|---|---|---|---|---|---|
| | 1421.1 | | | 1510.2 | 1719.9 |
| | | 300.6 | | 471.3 | |
| 1871.2 | | 402.5 | 1503.2 | 2121.2 | |
| 471.3 | 2271.2 | 501.2 | 200.2 | 1602.2 | 1321.1 |
| 2201.1 | 1003.1 | | 1311.1 | 2052.3 | |

# K-MEANS CLUSTERING BASED DATA MINING SYSTEM AND METHOD USING THE SAME

CROSS-REFERENCE TO RELATED APPLICATION

This application claims priority to and the benefit of Korean Patent Application No. 10-2018-0053366 filed in the Korean Intellectual Property Office on May 9, 2018, the entire contents of which are incorporated herein by reference.

BACKGROUND

(a) Field

The present invention relates to a K-means clustering based data mining system and a K-means clustering method using the same.

(b) Description of the Related Art

It is necessary to preventing personal information from being exposed when disclosing data and when disclosing the results of algorithms that utilize the data. There have recently been several studies such as k-anonymity and l-diversity in order to prevent the personal information from being exposed in the public data. However, when an attacker has background knowledge of the data, the personal information can be exposed through a minimality attack.

On the other hand, a technique of protecting data using differential privacy is more secure than the existing techniques because it can probabilistically hide data existence of a certain person regardless of the attacker's background knowledge. Therefore, data disclosure techniques using the differential privacy have been studied variously and techniques for disclosing the results of data mining as well as the data disclosure also have been studied.

The differential privacy is generally satisfied by inserting Laplacian-distributed noise. In the histogram, the differential privacy is established by inserting noise of Lap ($1/\varepsilon$) into the frequency of each bucket. The greater the number of buckets, the finer the data can be represented, but the less data is used because of the number of insertions of noise is increased.

SUMMARY

An embodiment of the present invention provides a data mining system and a K-means clustering method using the same, using a differentially private K-means clustering algorithm using a quad-tree.

According another embodiment of the present invention provides a method of performing K-means clustering by a data mining system is provided. The method generating a plurality of initial buckets by dividing data including a plurality of points each being expressed in coordinate information, reflecting a count noise in a number of points included in each of the initial buckets and then generating a plurality of new buckets by dividing at least one initial bucket among the initial buckets based on a first threshold and a second threshold, generating a plurality of final buckets from the plurality of initial buckets or the plurality of new buckets, generating a histogram including section information for each of the final buckets and a number of points included in each of the final buckets in which the count noise is reflected, and performing K-means clustering on the histogram based on a number of clusters.

Generating the plurality of initial buckets may include receiving input information including the plurality of points, an information protection level for protecting first information and second information on the plurality of final buckets generated based on the data, an information protection level ratio indicating a protection ratio of the first information and second information, and the number of clusters for performing the K-means clustering.

Generating the plurality of initial buckets may include calculating the first threshold for limiting a number of points to be included in each of the plurality of final buckets generated based on the data and the second threshold for limiting a number of times a same bucket is divided.

The first threshold may be calculated based on the number of points, and the second threshold may be calculated based on the number of points and a dimension of coordinates forming the data.

Generating the plurality of buckets may include reflecting the count noise to each of the initial buckets and then determining whether a number of points included in each of the initial buckets in which the count noise is reflected is greater than the first threshold, when the number of points included in a certain initial bucket among the initial buckets is greater than the first threshold, determining whether a number of times the certain initial bucket has been divided is greater than the second threshold, and when the number of times the certain initial bucket has been divided is not greater than the second threshold, generating the plurality of new buckets by dividing the certain initial bucket.

A process of generating the plurality of new buckets may be repeated for a certain new bucket satisfying a first condition that a number of points included in the certain new bucket is not greater than the first threshold and a second condition that a number of times the certain new bucket has been divided is greater than the second threshold, and the new bucket satisfying the first condition and the second condition may be determined as the final bucket.

Receiving the input information may include calculating a first information protection level for protecting the first information and a second information protection level for protecting the second information by using the information protection level, and the information protection level ratio. The first information may be reference information for a bucket section to be divided to protect the section information for each of the plurality of new buckets, and the second information may be reference information for generating the count noise to protect the number of points included in each of the plurality of new buckets.

A plurality of points included in each of the plurality of new buckets may be distributed in a quad-tree manner.

According to yet another embodiment of the present invention, a data mining system including a histogram generating module and a K-means clustering module is provided. The histogram generating module receives input information including data including a plurality of points each being expressed by coordinates information, an information protection level for protecting first information and second information on a plurality of final buckets to be generated based on the data, an information protection level ratio indicating a protection ratio of the first information and second information, and a number of clusters for performing K-means clustering, generates a plurality of final buckets from the data by using a quad-tree and the received information, and generates a histogram satisfying differential privacy by protecting information on the plurality of final buckets. The K-means clustering module distributes the histogram satisfying the differential privacy and the data into clusters corresponding to the number of clusters.

The histogram generating module may calculate a first threshold for limiting a number of points to be included in each of the plurality of final buckets data and a second threshold for limiting a number of times a same bucket is divided. The first threshold may be calculated based on the number of points, and the second threshold may be calculated based on the number of points and a dimension of coordinates forming the data.

The histogram generating module may calculate a first information protection level for protecting the first information and a second information protection level for protecting the second information by using the information protection level and the information protection level ratio. The first information may be reference information for a bucket section to be divided to protect section information for each of the plurality of final buckets, and the second information may be reference information for generating a count noise to protect the number of points included in each of the plurality of final buckets.

The histogram generating module may check a distribution of the received data and generates a plurality of initial buckets by dividing the data, and generate a plurality of new buckets by determining whether a number of points included in each of the initial buckets in which the count noise is reflected is greater than the first threshold and determining whether a number of times each of the initial buckets has been divided is greater than the second threshold.

According to an embodiment of the present invention, compared to the conventional histogram-based algorithms, the number of buckets used to represent data distribution is reduced, but there are fewer errors in clusters.

BRIEF DESCRIPTION OF THE DRAWINGS

FIG. 4 is a diagram showing an example of a histogram using a quad-tree according to an embodiment of the present invention.

FIG. 5 is a diagram showing an example of a histogram satisfying differential privacy according to an embodiment of the present invention.

DETAILED DESCRIPTION OF THE EMBODIMENTS

Figure 1:
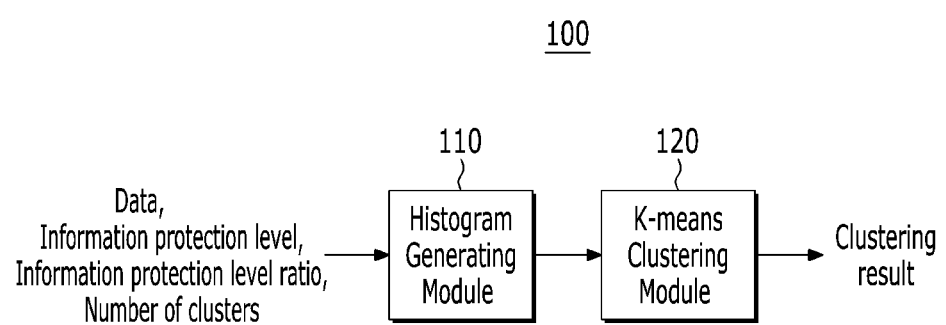
FIG. 1 is a structural diagram of a data mining system according to an embodiment of the present invention.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" or "include" is understood to imply the inclusion of stated elements but not the exclusion of any other elements.

There are differentially private Lloyd clustering and differentially private k-means clustering using an extended uniform-grid, as the existing differentially private algorithms.

The differentially private Lloyd algorithm computes a new cluster assuming that data belongs to the nearest cluster among clusters obtained in the previous step. During this process, each iteration computes a sum of coordinates and the number of points in a cluster and a pre-calculated noise Lap (2*maxIter/ε) is inserted to each iteration. The iterations are repeated a predetermined iteration times (maxIter) such that the ε-differential privacy is satisfied.

Since this algorithm is started by setting the total number (maxIter) of iterations before finding the cluster and an information protection level is divided by the number of iterations, an amount of inserted noise is increased as the number of repetitions is increased. On the other hand, if the number of iterations is decreased, the algorithm can be terminated before a center of the cluster is found.

The differentially private k-means clustering using the extended uniform-grid finds for data distribution satisfying the differential privacy so that the inserted noise does not increase even if being averaged over the number of times and uses the general k-means algorithm using the data distribution not the differentially private algorithm. Therefore, the noise is inserted once regardless of the number of iterations of the clustering algorithm.

However, a histogram is generated by dividing data with the uniform-grid in order to find for the data distribution satisfying the differential privacy. In this case, if the amount of data increases or the information protection level increases, the number of sections, called buckets, into which the data is divided increases. As the number of buckets increases, the data distribution can be finely expressed, but the amount of inserted noise increases because the noise is inserted as many as the number of buckets.

To address this issue, an embodiment of the present invention uses a differentially private k-means clustering algorithm using a quad-tree for expressing the data distribution while reducing the number of buckets. Hereinafter, an embodiment of the present invention is described in detail with reference to the drawings.

FIG. 1 is a structural diagram of a data mining system according to an embodiment of the present invention.

As shown in FIG. 1, a data mining system 100 operated by at least one processor includes a histogram generating module 110 and a K-means clustering module 120.

The histogram generating module 110 receives data, an information protection level ε, an information protection level ratio R and the number of clusters from the outside.

The data is a set of points that can be expressed in coordinates. That is, coordinate values of points that can be expressed in n-dimensional coordinates (where 'n' is an integer) are referred to as the data.

The histogram generating module 110 calculates a first information protection level $\varepsilon_1$ and a second information protection level $\varepsilon_2$ by using the information protection level ε and the information protection level ratio R. When calculating the first information protection level $\varepsilon_1$ and the second information protection level $\varepsilon_2$, the information protection level ratio R and the information protection level ε is multiplied to calculate a noise to be inserted in a bucket section and a noise to be reflected in the number of points within the bucket.

While it is described in an embodiment of the present invention that the information protection level is divided so that the first information protection level $\varepsilon_1$ is R*ε and the second information protection level $\varepsilon_2$ is (1−R)*ε. However, the present invention is not limited thereto.

The histogram generating module 110 calculates a first threshold and a second threshold. The first and second thresholds are reference information for appropriately expressing data distribution in a quad-tree manner so that the number of points included in one bucket is less than the first threshold and the same bucket is divided the second threshold times or less, when the bucket is generated.

The histogram generating module 110 divides the data received from the outside into a plurality of initial buckets, the number of initial buckets being a predetermined number. The initial buckets are generated by dividing the data so that intervals of the data domain have a uniform interval.

The histogram generating module 110 generates a histogram using a quad-tree from the initial buckets which are divided with a uniform-grid. That is, the histogram generating module 110 checks whether there is an initial bucket including points the number of which is greater than the first threshold, for each of the initial buckets.

If there is the initial bucket including points the number of which is greater than the first threshold, the histogram generating module 110 determines whether the number of times initial bucket has been divided is greater than the second threshold. If the number of times the initial bucket has been divided is not greater than the second threshold, the histogram generating module 110 divides a section of the initial bucket into a plurality of new buckets. However, if it is determined that the number of times the bucket has been divided is greater than the second threshold, the histogram generating module 110 stops dividing the initial bucket.

Here, when checking whether there is the initial bucket including points the number of which is greater than the first threshold, the histogram generating module 110 first counts the correct number of points within the initial bucket and then compares a value obtained by inserting a count noise in the counted number with the first threshold. To this end, the histogram generating module 110 calculates the count noise in consideration of the second information protection level. This is to ensure that the number of points included in each bucket is not exposed to the outside, which is referred to as satisfying privacy.

For example, it is assumed that the first threshold is 10, the number of points included in a certain initial bucket is 9 and the count noise is calculated to be 2.1. Then, the histogram generating module 110 calculates that the certain initial bucket has 11.1 points obtained by inserting the noise, 2.1 in the number of actual points, 9.

Therefore, the histogram generating module 110 determines that the number of points in the certain initial bucket is 11.1, which exceeds 10, i.e., the first threshold. As a result, the histogram generating module 110 divides the certain initial bucket. The section of the certain initial bucket divided by the histogram generating module 110 becomes a section satisfying the differential privacy.

Here, the method of dividing the initial bucket or the new bucket generated by dividing the initial bucket is not limited to the above-described method and the number of buckets generated from the initial bucket is not limited to any one number. Further, the method of determining whether the same bucket is divided into the data the number of which is greater than the second threshold can be performed in various manners and an embodiment of the present is not limited to any one method.

The histogram generating module 110 generates a histogram including count information generated by inserting the count noise in the number of leaf nodes of each bucket and section information of final buckets which are generated by the division. Such a histogram becomes a histogram satisfying the differential privacy.

The K-means clustering module 120 calculates a distance between a center of the cluster and distributed individual points by using the cluster number information received by the histogram generating module 110, assigns the distance to the cluster and then outputs cluster center information as many as the number of clusters. That is, clustering is performed by using a K-means clustering algorithm. In this case, the points are distributed in the center of the plurality of buckets according to the histogram satisfying the differential privacy.

The K-means clustering module 120 outputs a result of clustering the data. Here, the result of clustering is not limited to any one form and a detailed description of performing K-means clustering on data is omitted in an embodiment of the present invention because the K-means clustering algorithm is already known.

A method of performing clustering using the above-described data mining system 100 is described with reference to FIG. 2

Figure 2:
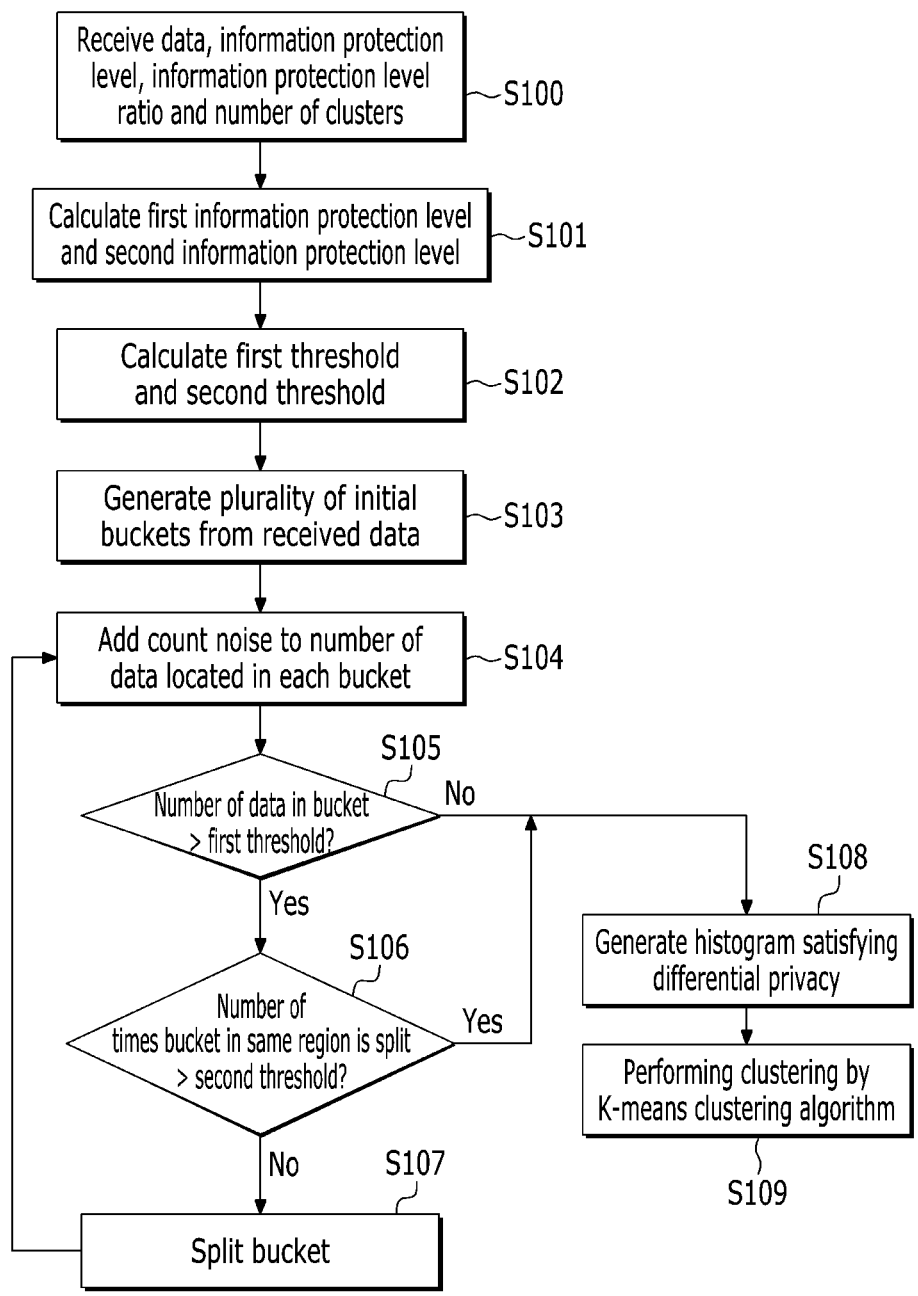
FIG. 2 is a flowchart of a clustering method according to an embodiment of the present invention.

FIG. 2 is a flowchart of a clustering method according to an embodiment of the present invention.

As shown in FIG. 2, a data mining system 100 receives data including a plurality of points in the form of coordinates, an information protection level, an information protection level ratio and a number of clusters (S100). The data mining system 100 then calculates the first information protection level and the second information protection level based on the information protection level and the information protection level ratio (S101). The first information protection level is calculated by multiplying the information protection ratio by the information protection level (R*ε). The second information protection level is calculated by multiplying the information protection level by a value obtained by subtracting the information protection ratio from one ((1−R)*ε).

The data mining system 100 calculates a first threshold and a second threshold (S102). Here, the first threshold is reference information for allowing the number of points included in one bucket to be less than the first threshold when the bucket is generated, in order to appropriately express data distribution in a quad-tree manner. Further, the second threshold is reference information for dividing the same bucket the second threshold times or less. While the first threshold and the second threshold are described, by way of example, by using the following Equation 1, they are not limited thereto.

$$\text{First threshold} = 1/1000 * n$$
$$\text{Second threshold} = \frac{1}{d}\log n - 1$$

Equation 1

Here, is an integer that is the number of points and denotes a dimension of original data.

When the first information protection level, the second information protection level, the first threshold and the second threshold are calculated through the above-described process, the data mining system 100 generates a plurality of initial buckets from the data received in step S100 (S103).

At this time, the initial buckets are generated as many as a predetermined number and a size of a section of each initial bucket, that is, a data domain, is the same for all the initial buckets.

When the initial buckets are generated, the data mining system 100 inserts a count noise in the number of points included in each initial bucket (S104). In some embodiments, the count noise may be expressed as $Lap(1/\varepsilon_2)$. Here, Lap(x) denotes a random variable sampled from the Laplace distribution with scale parameter x. For each of the buckets in which the count noise is inserted, the data mining system 100 determines whether the number of points included in each initial bucket is not greater than the first threshold (S105). If the data is divided into uniform intervals based on the conventional technique, buckets are generated in the data-free region to increase the number of noise insertions and the data distribution cannot be appropriately expressed since the data is divided into uniform intervals in the data-crowded region. Therefore, the processing in step S105 can solve this problem.

If there is a bucket having points the number of which is greater than the first threshold, the data mining system 100 determines whether the number of times the bucket has been divided is greater than the second threshold (S106). Here, the method of determining how many times the same bucket has been divided by the data mining system 100 may be performed in various ways, so that its detailed description is omitted in an embodiment of the present invention.

If the number of times is not greater than the second threshold, the data mining system 100 divides the bucket to generate new buckets (S107). Then, the processing after step S104 is repeated to determine a final bucket satisfying conditions in steps S105 and S106.

However, if the number of times is greater than the second threshold, or if there is no bucket including points the number of which the number is greater than the first threshold, the data mining system 100 generates a histogram that includes section information of each of final buckets which are generated by division and the number of points in which the count noise is inserted in each final bucket (S108). Such a histogram satisfies differential privacy.

When the histogram is generated in step S108, the data mining system 100 performs clustering on data received in step S100 by using a K-means clustering algorithm, by referring to the generated histogram (S109).

When the clustering is performed in step S109, assuming that the points in each bucket exist in a center of each bucket as many as the number of points in which the count noise is inserted, the clustering is performed by the number of clusters received in step S100. Since the method of clustering the histogram by the K-means clustering algorithm is the same as a general clustering method, its detailed description is omitted in an embodiment of the present invention.

The above-described method may be represented by an algorithm as in below Table 1.

TABLE 1

| | |
|---|---|
| Input: | data D = {$x_1$, ..., $x_n$}, $x_i \in R^d$ |
| | information protection level $\varepsilon$ |
| | information protection level ratio R |
| | the number of clusters k |
| Output: | cluster centers C = { $c_1$, $c_2$ ,..., $c_k$} |
| 1. | $\varepsilon_1 \leftarrow R * \varepsilon$ , $\varepsilon_2 \leftarrow (1 - R) * \varepsilon$ |
| 2. | $maxDepth \leftarrow \frac{1}{d}\log n - 1$, $Threshold \leftarrow \frac{1}{1000}n$ |
| 3. | T ← build Quadtree(D, $\varepsilon_1$, maxDepth, Threshold) |
| 4. | Leaves ← find leaf nodes in Quad Tree T |
| 5. | For each leaf in Leaves |
| 6. |    $f_i' = f_i + Lap(1/\varepsilon_2)$ |
| 7. |    $r_i$ ← center of leaf node's rectangle |
| 8. |    D' ← D' + {($r_i$, $f_i'$)} |
| 9. | C ← Kmeans(D', k) |
| 10. | Return C = {$c_1$, ... , $c_k$} |

As shown in Table 1, the data mining system 100 receives the original data D, the information protection level $\varepsilon$ to be applied to the quad-tree, the information protection level ratio R and the number of clusters k.

The data mining system 100 which has received the information protection level and the original data divides the information protection level into a first information protection level $\varepsilon_1$ and a second information protection level $\varepsilon_2$. The data mining system 100 may divide the information protection level so that the first information protection level $\varepsilon_1$ is $R*\varepsilon$ and the second information protection level $\varepsilon_2$ is $(1-R)*\varepsilon$. When calculating the first information protection level and the second information protection level, the information protection level ratio and the information protection level is multiplied to obtain a noise to be inserted in the bucket section and a noise to be reflected in the number of points in the bucket section.

Then, the data mining system 100 calculates a first threshold Threshold and a second threshold maxDepth. The first threshold may be calculated as $\frac{1}{1000}*n$, which corresponds to an upper threshold of the number of points included in the bucket. The second threshold may be calculated as $$\frac{1}{d}\log n - 1$$

so that the bucket formed in any region is divided maxDepth times or less. Here, 'n' is an integer that is the number of points and 'd' is a dimension of the original data.

Upon calculating the first information protection level from the information protection level and calculating the first threshold and the second threshold, the data mining system 100 generates a quad-tree T by using the original data, the first information protection level, the first threshold and the second threshold. The quad-tree is generated to obtain a bucket domain of a histogram. Because the quad-tree is generated by inserting a noise associated with the first protection level in a base domain, one bucket domain is not exactly exposed to the outside, that is, information about the bucket domain is exposed with being protected.

This embodiments is be described with reference to FIG. 3

Figure 3:
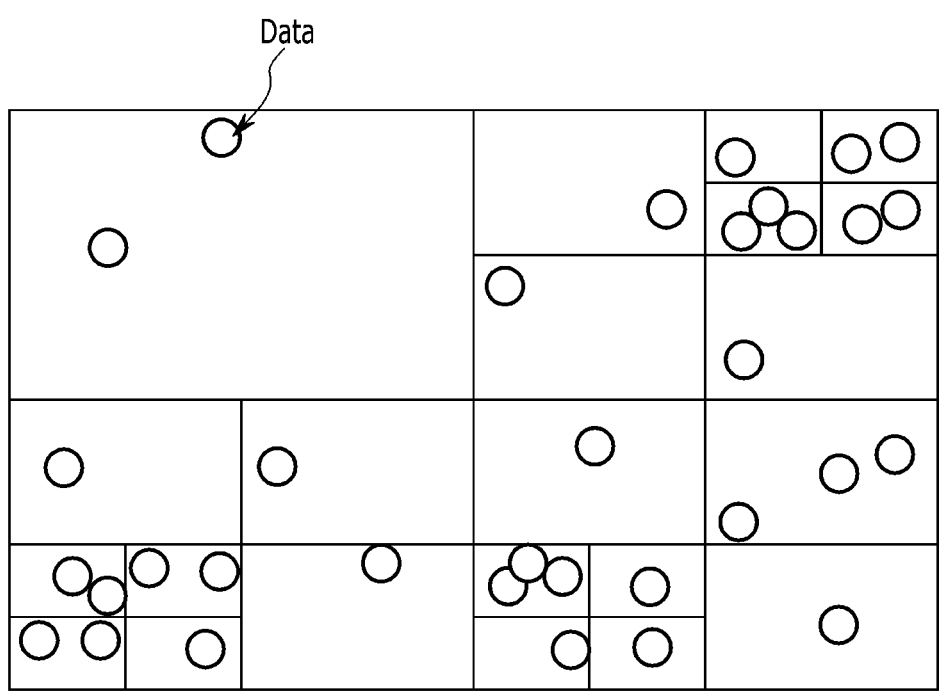
FIG. 3 is a drawing showing an example of a histogram satisfying differential privacy according to an embodiment of the present invention.

FIG. 3 is a drawing showing an example of a histogram satisfying differential privacy according to an embodiment of the present invention.

As shown in FIG. 3, it is assumed that points represented by circles are distributed at various positions and each point is formed in two-dimensional coordinates.

Conventionally, a bucket is divided with the uniform-grid so that the respective bucket sections have the same interval. However, in an embodiment of the present invention, when the quad-tree is generated by using the first information protection level, the first threshold and the second threshold, the number of buckets is reduced and the respective bucket sections do not have the same interval so that the information of the histogram including the number of points included in each bucket and the section information of each bucket can be protected.

Referring to FIG. 3 again, the data mining system 100 calculates the number f of points in the bucket of the histogram after determining the bucket domain in which the information of the histogram is protected. When calculating the number of points included in one bucket, the noise associated with the second information protection level is reflected in the number of points in the bucket. This is described with reference to FIG. 4 and FIG. 5.

FIG. 4 is a diagram showing an example of a histogram using a quad-tree according to an embodiment of the present invention and FIG. 5 is a diagram showing an example of a histogram satisfying differential privacy according to an embodiment of the present invention.

A numeral shown in FIG. 4 denotes the number of points located in each of the buckets generated in FIG. 4 and a numeral shown in FIG. 5 denotes the number of points generated by reflecting the noise to the number of points in the bucket. Because the noise calculated by the second information protection level is reflected into the number of points included in each bucket calculated in FIG. 4 as shown in FIG. 5, the number of points in each bucket cannot be accurately exposed to the outside so that the information can be protected.

Referring to FIG. 3 again, after reflecting the noise into the number of points in each bucket, the data mining system 100 performs the K-means clustering, assuming that all the points are located at an center $r_i$ of each bucket. The clustering is performed by the number of clusters received as an input and the cluster centers are outputted as many as the number of clusters. An algorithm for finding the cluster centers for the clustering may be shown as in below Table 2. Accordingly, in some embodiments, after the cluster centers are set by using, for example, the algorithm shown in Table 2, the K-means clustering may be performed.

TABLE 2

| | |
|---|---|
| Input: | data domain = { $m_1$ and $M_1$, ..., $(m_d, M_d)$} |
| | the number of clusters k |
| Output: | cluster centers C = {$c_1$, ..., $c_k$} |
| 1. | length ← $(\Sigma_i(M_i - m_i)^2)^{0.5}$ |
| 2. | While(1) |
| 3. |    for (i=0; i<100; ++i) |
| 4. |       C ← random sample k centers in domain R |
| 5. |       flag ← true |
| 6. |       for i, j in \|C\| |
| 7. |          if \|$c_i - c_j$\| < length |
| 8. |             flag ← false |
| 9. |    if flag = true |
| 10. |       return C = {$c_1$, ..., $c_k$} |
| 11. |    length ← length * 0.9 |

When the clustering begins, the center coordinates of the clusters should be determined. If the centers of initial clusters are gathered in one place, the clustering is not performed properly. Therefore, the algorithm shown in Table 2 is an algorithm for finding distant points to be set to the centers of the clusters. The algorithm shown in Table 2 is an example, and the present invention is not limited thereto.

A range R of the received data shows minimum and maximum values between which points can exist. For example, height and weight may be represented by (0 cm, 200 cm) and (0 kg, 100 kg).

Once the data domain is determined, the longest distance between the points, i.e., a diagonal length, in a space formed by the data range is found. If there are k points which are separated by the diagonal length, these k points are used as the centers of clusters.

Since the longest distance length is found, the k points may be not separated by length in the beginning. Therefore, the data mining system 100 samples arbitrary points and determines whether the sampled points are separated by length. If the sampled points are separated by length, the sampled points are used arbitrary as the centers of the clusters. However, even if the sampling is repeated for the maximum number of iterations, the points separated by length may not be found. In this case, length is reduced to relax the condition (for example, length may be reduced to length*0.9) so that the points can be found even if they are slightly separated. The k-points to be selected as the centers of the clusters are found by repeating this process.

The information protection level ratio R used in the above-described algorithm is a ratio for determining how the first information protection level and the second information protection level are divided. This is described with reference to FIG. 6.

Figure 6:
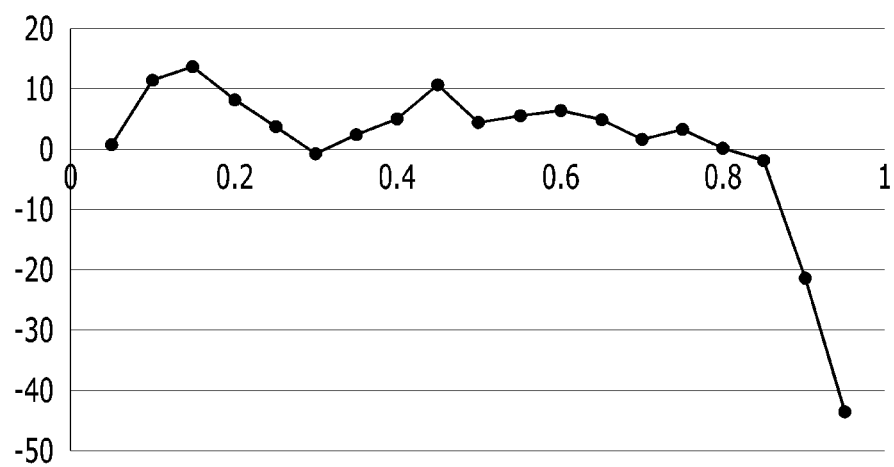
FIG. 6 is a diagram exemplifying a relative clustering performance difference according to an information protection level ratio in an embodiment of the present invention.

FIG. 6 is a diagram exemplifying a relative clustering performance difference according to an information protection level ratio in an embodiment of the present invention.

As shown in FIG. 6, in an error (performance) according to an information protection level ratio R, if the information protection level ratio R is small, less noise Lap (1/R*ε) is inserted when the quad-tree is calculated so that the data distribution may not be finely found, but more noise Lap (1/(1−R)*ε) is inserted in the number of points in each bucket so that the number of points may be relatively accurate.

In a case of ε=0.05, it can be confirmed that the relative clustering performance is good at R=0.15. The information protection level ratio R used in an embodiment of the present invention is not limited to 0.15.

Figure 7:
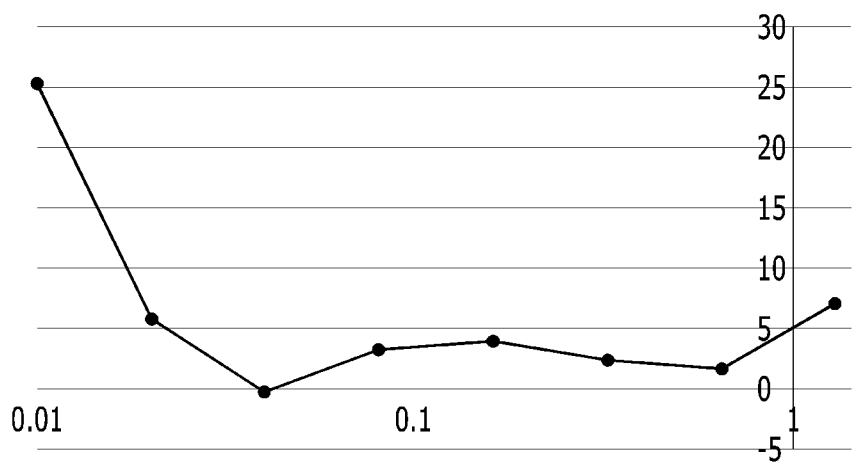
FIG. 7 is a diagram exemplifying a relative clustering performance difference according to an information protection level in an embodiment of the present invention.
Figure 8:
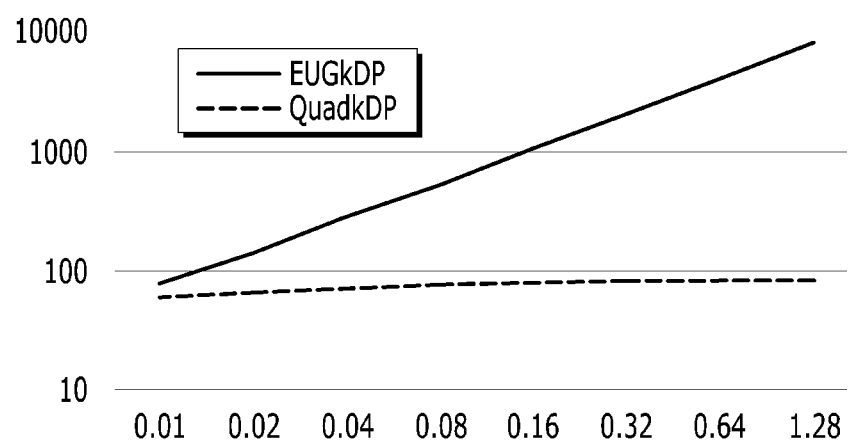
FIG. 8 is a diagram exemplifying a bucket number according to an information protection level in an embodiment of the present invention.

FIG. 7 is a diagram exemplifying a relative clustering performance difference according to an information protection level in an embodiment of the present invention and FIG. 8 is a diagram exemplifying a bucket number according to an information protection level in an embodiment of the present invention.

FIG. 7 shows a relative clustering performance difference according to an information protection level ε. Although the performance varies depending on the information security level ε, there is a performance improvement of up to 25%. This means that the quad-tree finds for the more appropriate data distribution for k-means clustering than an algorithm of generating a histogram by division with the uniform-grid.

In an embodiment of the present invention, the number of buckets may be generated differently according to the information protection level ε. The number of buckets generated according to the information protection level ε is as shown in FIG. 8.

While the number of buckets increases as the information protection level ε increases in the differentially private k-means clustering using the extended uniform-grid (EU-GkDP), a small number of leaf nodes (buckets) can be maintained regardless of the information protection level ε in an embodiment of the present invention (QuadkDP). This means that the number of noise insertions can be reduced and the clustering can be performed faster for a large amount of data.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A method of performing K-means clustering by a data mining system, the method comprising:
   generating a plurality of initial buckets by dividing data including a plurality of points each being expressed in coordinate information;
   inserting a count noise in a number of points included in each of the initial buckets, and then generating a plurality of new buckets by dividing at least one initial bucket among the initial buckets based on a first threshold and a second threshold;
   generating a plurality of final buckets from the plurality of initial buckets or the plurality of new buckets;
   generating a histogram including section information for each of the final buckets and a number of points included in each of the final buckets in which the count noise is inserted; and
   performing K-means clustering on the histogram based on a number of clusters.

2. The method according to claim 1, wherein generating the plurality of initial buckets comprises receiving input information including the plurality of points, an information protection level for protecting first information and second information on the plurality of final buckets generated based on the data, an information protection level ratio indicating a protection ratio of the first information and second information, and the number of clusters for performing the K-means clustering.

3. The method of claim 2, wherein generating the plurality of initial buckets comprises calculating the first threshold for limiting a number of points to be included in each of the plurality of final buckets generated based on the data, and the second threshold for limiting a number of times a same bucket is divided.

4. The method of claim 3, wherein the first threshold is calculated based on the number of points, and the second threshold is calculated based on the number of points and a dimension of coordinates forming the data.

5. The method of claim 4, wherein generating the plurality of buckets comprises:
   inserting the count noise to each of the initial buckets and then determining whether a number of points included in each of the initial buckets in which the count noise is inserted is greater than the first threshold;
   when the number of points included in a certain initial bucket among the initial buckets is greater than the first threshold, determining whether a number of times the certain initial bucket has been divided is greater than the second threshold; and
   when the number of times the certain initial bucket has been divided is not greater than the second threshold, generating the plurality of new buckets by dividing the certain initial bucket.

6. The method of claim 5, wherein a process of generating the plurality of new buckets is repeated for a certain new bucket satisfying a first condition that a number of points included in the certain new bucket is not greater than the first threshold and a second condition that a number of times the certain new bucket has been divided is greater than the second threshold, and the new bucket satisfying the first condition and the second condition is determined as the final bucket.

7. The method of claim 6, wherein receiving the input information comprises calculating a first information protection level for protecting the first information and a second information protection level for protecting the second information by using the information protection level and the information protection level ratio, and
   wherein the first information is reference information for a bucket section to be divided to protect the section information for each of the plurality of new buckets, and the second information is reference information for generating the count noise to protect the number of points included in each of the plurality of new buckets.

8. The method of claim 7, wherein a plurality of points included in each of the plurality of new buckets are distributed in a quad-tree manner.

9. A data mining system, comprising:
   a histogram generating module that receives input information including data including a plurality of points each being expressed by coordinates information, an information protection level for protecting first information and second information on a plurality of final buckets to be generated based on the data, an information protection level ratio indicating a protection ratio of the first information and second information, and a number of clusters for performing K-means clustering, generates a plurality of final buckets from the data by using a quad-tree and the received information, and generates a histogram satisfying differential privacy by protecting information on the plurality of final buckets; and
   a K-means clustering module that distributes the histogram satisfying the differential privacy and the data into clusters corresponding to the number of clusters.

10. The data mining system of claim 9, wherein the histogram generating module calculates a first threshold for limiting a number of points to be included in each of the plurality of final buckets data and a second threshold for limiting a number of times a same bucket is divided, and
    wherein the first threshold is calculated based on the number of points, and the second threshold is calculated based on the number of points and a dimension of coordinates forming the data.

11. The data mining system of claim 10, wherein the histogram generating module calculates a first information protection level for protecting the first information and a second information protection level for protecting the second information by using the information protection level and the information protection level ratio, and
    wherein the first information is reference information for a bucket section to be divided to protect section information for each of the plurality of final buckets, and the second information is reference information for generating a count noise to protect the number of points included in each of the plurality of final buckets.

12. The data mining system of claim 11, wherein the histogram generating module:
    checks a distribution of the received data and generates a plurality of initial buckets by dividing the data; and
    generates a plurality of new buckets by determining whether a number of points included in each of the initial buckets in which the count noise is reflected is greater than the first threshold and determining whether a number of times each of the initial buckets has been divided is greater than the second threshold.

13. The data mining system of claim 12, wherein the plurality of new buckets differ in a plurality of new bucket sections and a number of data included in each of the plurality of new buckets.

14. The data mining system of claim 12, wherein the histogram generating module generates a histogram including a number of points included in each of the final buckets in which the count noise is reflected and section information for each of the final buckets.

* * * * *